United States Patent [19]
Walker et al.

[11] Patent Number: 6,106,233
[45] Date of Patent: Aug. 22, 2000

[54] METHOD FOR LINEAR FRICTION WELDING AND PRODUCT MADE BY SUCH METHOD

[75] Inventors: Herbert L. Walker, Glastonbury; Stephen A. Hilton; JoAnn Barbieri, both of Vernon; John P. Fournier, Portland; Richard D. Trask, Simsbury, all of Conn.

[73] Assignee: United Technologies Corporation, Hartford, Conn.

[21] Appl. No.: 09/243,502

[22] Filed: Jan. 25, 1999

Related U.S. Application Data

[62] Division of application No. 08/994,769, Dec. 19, 1997.

[51] Int. Cl.$^7$ ........................................... F01D 5/30
[52] U.S. Cl. ................................ 416/213 R; 416/219 R; 228/112.1
[58] Field of Search ........................... 416/213 R, 213 A, 416/219 R, 220 R, 241 R, 241 A; 228/112.1, 114

[56] References Cited

U.S. PATENT DOCUMENTS

| | | | |
|---|---|---|---|
| 3,297,301 | 1/1967 | Petrie et al. | 416/90 R |
| 3,910,719 | 10/1975 | Hessler et al. | 416/134 |
| 5,366,344 | 11/1994 | Gillbanks et al. | 416/213 R |
| 5,551,623 | 9/1996 | Collot et al. | |

FOREIGN PATENT DOCUMENTS

| | | |
|---|---|---|
| 669183 | 8/1995 | European Pat. Off. . |
| 850718 | 7/1998 | European Pat. Off. . |
| 2760985 | 9/1998 | France . |

*Primary Examiner*—Edward K. Look
*Assistant Examiner*—Rhonda Barton

[57] ABSTRACT

A process for joining a base for an airfoil to a disk for an integrally bladed rotor stage in a gas turbine engine includes providing a disk having a radially outer rim with a slot defined therein by a recessed surface, and further includes providing a base having a longitudinally extending root portion facing opposite a longitudinally extending support portion for supporting the airfoil. The root portion has a root surface and the support portion has an outer surface. The process further includes bringing the root surface of the root portion into contact with the recessed surface bounding the slot, applying pressure and relative movement between the base and the rim to achieve during welding, substantial contiguity between the root surface and the recessed surface over the area of the recessed surface, resulting in a substantially continuous linear friction weld between the base and the rim.

26 Claims, 7 Drawing Sheets

METHOD FOR LINEAR FRICTION WELDING AND PRODUCT MADE BY SUCH METHOD

This is a division of copending application Ser. No. 08/994,769, filed on Dec. 19, 1997.

TECHNICAL FIELD

This invention relates to friction welding.

BACKGROUND ART

A typical gas turbine engine has an annular axially extending flow path for conducting working fluid through a compressor section, a combustion section, and a turbine section. The compressor and turbine sections each have a number of bladed rotor assemblies each including a plurality of blades circumferentially spaced about and secured to the radially outer periphery of a rotor disk.

In a conventional bladed rotor assembly, the rotor disk has a plurality of axial slots around its radially outer periphery. The blades comprise a root, a platform, and an airfoil. The platform has opposite facing surfaces. The root attaches to one of the surfaces, the airfoil attaches to the other. The slots and the roots have complementary shapes, typically either a dove tail or a fir tree. The root mates with the slot and the blade extends radially outward therefrom. This type of rotor assembly is relatively heavy, thereby necessitating that the rotor disk be sufficiently sturdy, and thus heavy, in order to accommodate the stresses resulting from the heavy blade.

Alternatively, the blades may be secured by bonding or welding, to the rotor disc to thereby form an integrally bladed rotor assembly (IBR). A major advantage of an integrally bladed rotor assembly is that there is often no need for an extended blade root or a blade platform. The airfoil may be secured directly to the radially outer periphery of the rotor disk. The absence of an extended root and a blade platform results in a blade that is lighter than a conventional blade. A lighter blade enables the use of a less rigid and lighter rotor disk, in which case the integrally bladed rotor assembly is overall much lighter than a conventional bladed rotor assembly.

A preferred method for bonding or welding the blade to the rotor disk is a linear friction welding process. In such a process, a surface on the blade is contacted (interfaced) to a surface on the disk. The interfacing surfaces typically have complementary geometries, i.e. similar lengths and similar widths. The two parts are rubbed together, in a reciprocating (back and forth), somewhat linear type oscillatory manner. The axis of the oscillation is typically roughly aligned with the longitudinal (lengthwise) axis of the interface, i.e., end to end. As the parts are rubbed, compressive force is applied to place the interface under high pressure. At the interface, frictional heat is generated and material from each part changes to a molten or preferably to a plastic state. Some of this material flows out from between the parts (flash flow), resulting in gradual decrease in the thickness, i.e. the dimension in the direction in which pressure is applied (the dimension perpendicular to the interface) of the parts. When the process is terminated, flash flow ceases, and at the interface, the remaining plastic state material of each part cools and changes back to solid state, forming bonds therein and bonding the two parts together.

Linear friction welding of the blades to the rotor disk has been accomplished using two different methods. The first method interfaces a surface on the base of the blade to a slightly elevated surface, i.e., stub, on the periphery of the rotor disc. The axis of oscillation is roughly aligned with the chord of the blade. This method has several drawbacks. Fabrication of a disk with stubs is difficult and costly because it requires complex machining, e.g., 5 axis milling. Furthermore, there is significant concern over the strength of the stub, i.e., its ability to withstand the linear friction welding process. In an original equipment manufacture situation, the manufacturer can provide oversize part geometries, i.e., excess material, to give the stub sufficient structure and rigidity to withstand the welding process. Complex (and thus somewhat costly) machining is then used to remove the excess material and thereby obtain a final shape. In a repair situation, however, the damaged portion is removed, leaving the stub, but the stub is already at its final shape. Without added measures the final shape stub may not have enough rigidity to withstand the forces needed for linear friction welding.

The second method, disclosed in U.S. Pat. No. 5,366,344 to Gillbanks et al., interfaces a blade having a root of generally wedge-like form with opposed converging surfaces, with an axial slot having opposed diverging surfaces, in the periphery of the disc,. This method too has disadvantages. It may be more costly and difficult to use because it requires four interface surfaces, two on the blade and two on the disk, rather than just two interface surfaces. Moreover, with this method, flash material, which can contain impurities that cause weld defects, will collect in the bottom of the slot. Although this flash could be removed, such an operation is expensive and it leaves a hole in the base of the slot. Further, the use of axial slots may prevent the use of this method for some compressor rotors, because the chord of the airfoils would interfere with linear oscillation of the blade relative to the disc. Furthermore, the interface surfaces are not perpendicular to the direction of the compressive force, thus, greater compression forces may be necessary to achieve adequate pressure at the interface for bonding.

G. B. Patent No. 1,053,420 (app. no. 32751 (11/8/64)) to Petrie et al. discloses an integrally bladed disk that includes a disk having axial recesses, of curvilinear profile, around its periphery, and blades having roots secured, by welding, in the recesses. However, Petrie et al. do not mention linear friction welding. Furthermore, blades having a geometry disclosed in Petrie et al. can not be oscillated within the axial recess without interfering with adjacent blades. Rather, Petrie et al. suggest that the roots may be welded in the recesses by electron beam welding. Electron beam welding is unlike linear friction welding, in that with electron beam welding, the structures being welded are stationary, rather than oscillating, relative to each other throughout the welding process. Moreover, the integrally bladed disks disclosed by Petrie et al. employ conventional blades having roots, platforms, and airfoils, and thus they do not offer the major advantage sought from an integrally bladed rotor assembly, low weight. Furthermore, the roots extend, and thereby position the platforms and the airfoils, radially outward from the periphery of the disk.

DISCLOSURE OF THE INVENTION

An object of the present invention is to provide an improved process for use in fabricating an integrally bladed rotor assembly in a gas turbine engine.

Another object of the present invention is to provide an improved process for joining a base for an airfoil to a disk for an integrally bladed rotor assembly in a gas turbine engine.

According to the present invention, a process for joining a base for an airfoil to a disk for an integrally bladed rotor stage in a gas turbine engine includes providing a disk having a radially outer rim with a radially outer surface. The radially outer rim has a slot defined therein by a recessed surface. The process further includes providing a base having a longitudinally extending root portion facing opposite a longitudinally extending support portion for supporting the airfoil. The root portion has a root surface and the support portion has an outer surface. The process further includes bringing the root surface of the root portion into contact with the recessed surface bounding the slot, applying pressure and relative movement between the base and the rim to achieve during welding, substantial contiguity between the root surface and the recessed surface over the area of the recessed surface, resulting in a substantially continuous linear friction weld between the base and the rim.

The present invention provides an improved method for use in fabricating and repairing an integrally bladed rotor stage. Unlike the prior art stub process, the process of the present invention can be used for repair as well as for original equipment manufacture. Further, since the linear friction weld is located in the rim rather than the airfoil, the weld experiences much less stress, e.g., 50% less in the best mode embodiment, during engine operation than the weld of the prior art stub process. Furthermore, because the present invention achieves, during the linear friction welding process, substantial contiguity between the root surface and the recessed surface over the area of the recessed surface, the present invention prevents flash from collecting at the base of the slot. Thus, the resulting weld between the base and the disk is substantially continuous and has less impurities, i.e., higher quality and fewer defects, than the prior art method that uses a root of generally wedge-like form with opposed converging surfaces and an axial slot having opposed diverging surfaces. Furthermore, in an embodiment of the present invention having a slot with a profile of at least substantially piecewise smooth shape and/or a recessed surface with an angle of inclination no greater than about 45 degrees, a bond of even higher quality will result. Substantially piecewise smooth shape is defined herein as a substantially curvilinear or substantially piecewise linear profile that may have corners with angles, although the fewer and the less pronounced any corners the better. Moreover, in the best mode embodiment, the outer surface of the support portion ends up substantially flush with the radially outer surface of the disk, thereby making possible an integrally bladed rotor that weighs significantly less than previous integrally bladed rotor assemblies that use conventional blades having extended roots and platforms. Further, sealing between adjacent blades is generally not required and the edge of the linear friction weld is generally in the flow path.

BEST MODE EMBODIMENT FOR CARRYING OUT THE INVENTION

Figure 1:
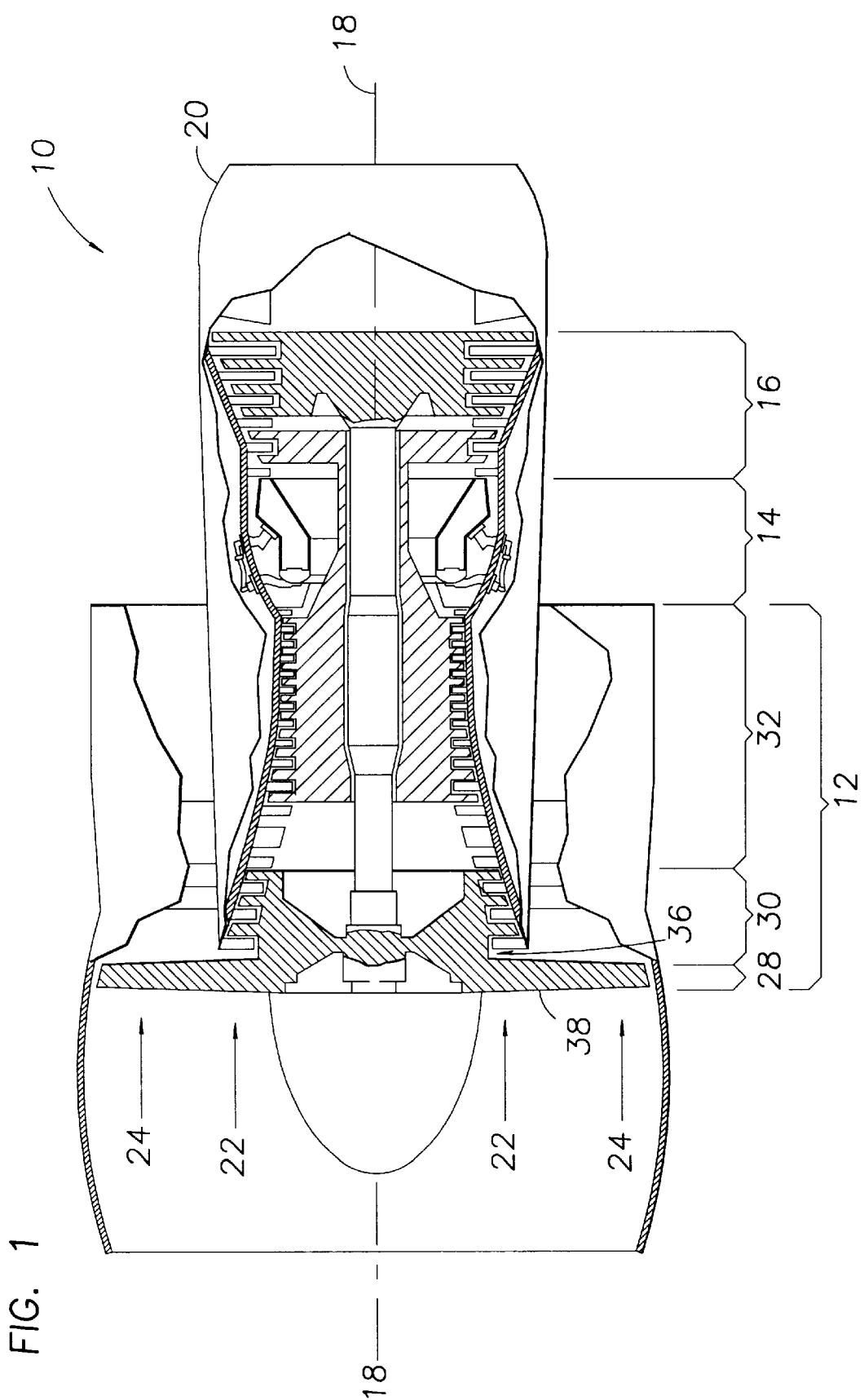
FIG. 1 is a schematic representation of an axial flow, turbofan gas turbine engine.

The present invention is disclosed with respect to a best mode embodiment for use in a gas turbine engine of the type illustrated in FIG. 1. Referring now to FIG. 1, a conventional gas turbine engine 10 includes compressor 12, combustor 14, and turbine 16 sections disposed along a longitudinal axis 18 and enclosed in an engine case 20. A primary flow path 22 for working fluid, e.g., air, extends longitudinally along the axis 18. A secondary flow path 24 for working fluid extends parallel to and radially outward of the primary flow path 22

The compressor 12 may include a fan 28, a low pressure compressor 30, and a high pressure compressor 32. The fan 28 includes a rotor assembly 36 having one or more integrally bladed rotor stages 38.

Figure 2:
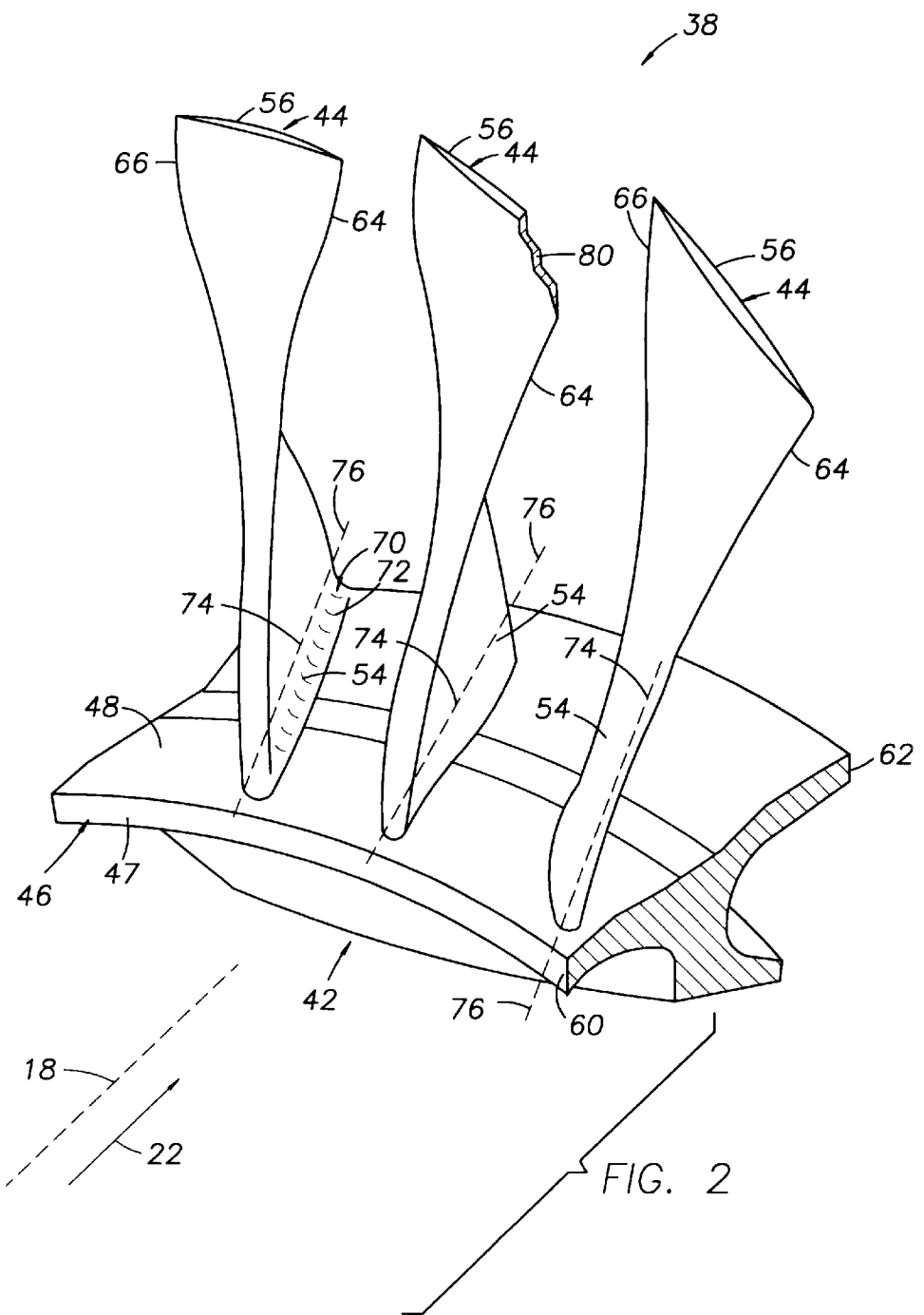
FIG. 2 is a fragmentary perspective view of a rotor assembly, used within the gas turbine engine of FIG. 1, having a damaged airfoil, which the method of the present invention may be used to repair.

Referring now to FIG. 2, an integrally bladed fan rotor stage 38 comprises a disk 42 and blades 44. The disk 42 has an outer rim 46 having a radially inner surface 47, and a radially outer surface 48. Each of the blades 44 includes an airfoil having a base 54 and a tip 56. The airfoils attach, at their bases 54, to the radially outer surface of the rim 46 and extend radially outward therefrom. It should be understood that the blades 44 are only three of a plurality of such blades attached to the disk 42. The disk further includes an upstream edge 60 and a downstream edge 62, relative to the gas flow path 22. The blades have upstream and downstream edges 64, 66.

The integrally bladed rotor stage 38 typically includes a fillet 70, i.e., a curved corner having a radius, adjoining the surfaces of the airfoil and the rim. The fillet serves to reduce the concentration of stress where the airfoils attach to the rim. The fillet itself may experience high concentrations of stress at its base 72, where the surface of the fillet is tangent to the disc rim.

A plurality of chords 74 each represent a chord of the base of an associated one of the airfoils, i.e. a line between the upstream edge 60 of the base of the airfoil and the downstream edge 62 of the base of the airfoil. The plurality of chords 74 are typically similarly oriented relative to the longitudinal axis 18. The chords each lie on an associated one of a plurality of chord lines 76 that collectively represent the desired positions of the chords relative to the disk rim.

One of the airfoils 44 on the integrally bladed rotor stage 38 has a damaged portion 80. Such damage may, for example, result from an impact with a foreign object (not shown), i.e., an object ingested into the engine 10 (FIG. 1). It is desirable to repair the integrally bladed rotor stage 38 so that the engine can operate at peak performance.

Figure 3:
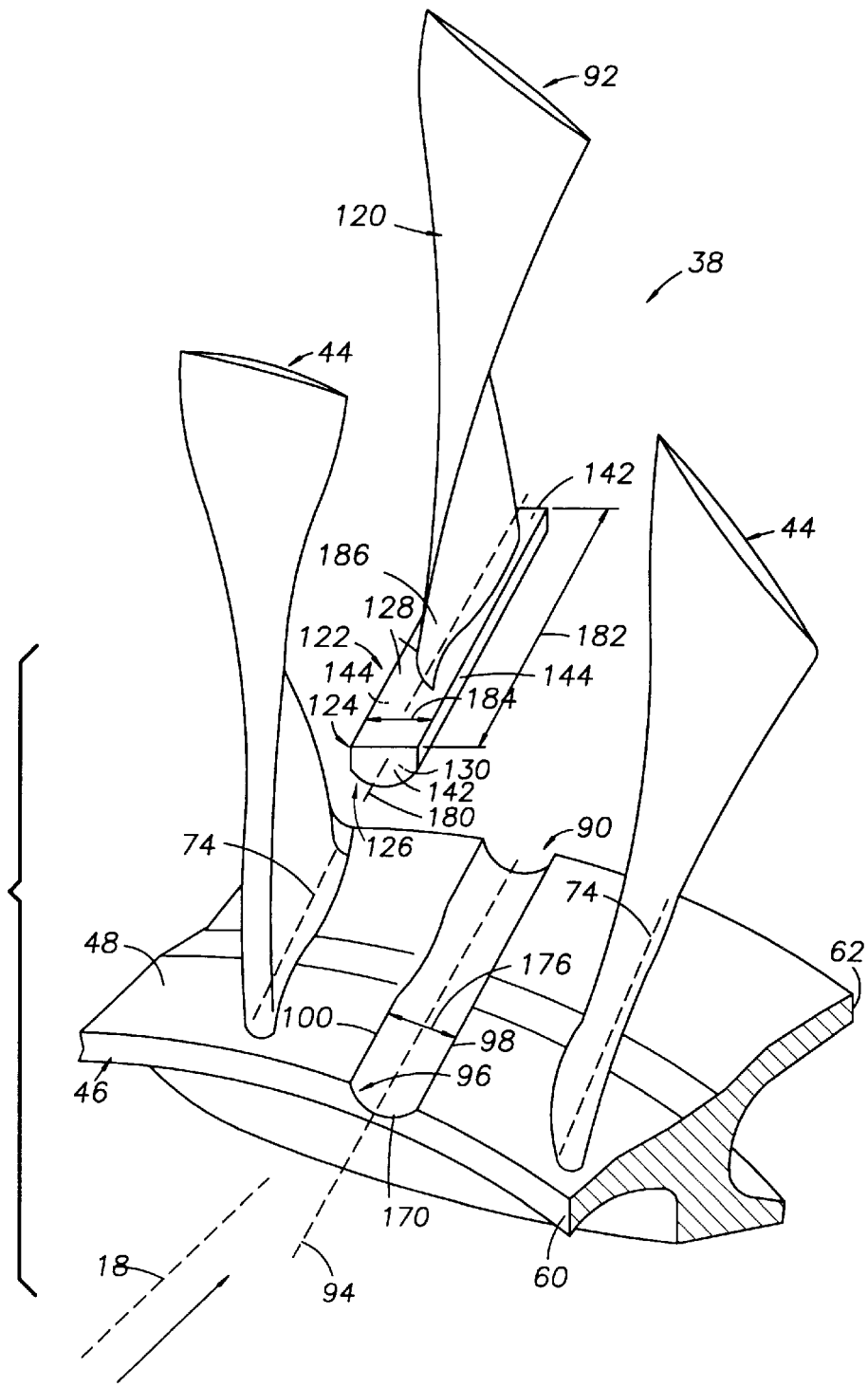
FIG. 3 is a fragmentary perspective view of the rotor assembly of FIG. 2, with the damaged airfoil removed and a slot formed in the disk rim, and a replacement blade.

Referring now to FIG. 3 a process for repairing the integrally bladed rotor stage 38 comprises removing the damaged airfoil (FIG. 2), forming a slot 90 in the disk rim 46, and providing a replacement blade 92 which is to be linear friction welded into the slot 90. The slot has a longitudinal axis 94 and is bounded, i.e., defined by a recessed surface 96 that may meet with the radially outer surface 48 of the disk rim at edges 98, 100. The replacement blade 92 includes a base 122 and an airfoil 120. The base 122 has a support portion 124 that supports the airfoil 120 and has an outer surface 128, and a root portion 126 with a root surface 130 facing in a direction generally opposite from that of the outer surface 128.

Figure 4:
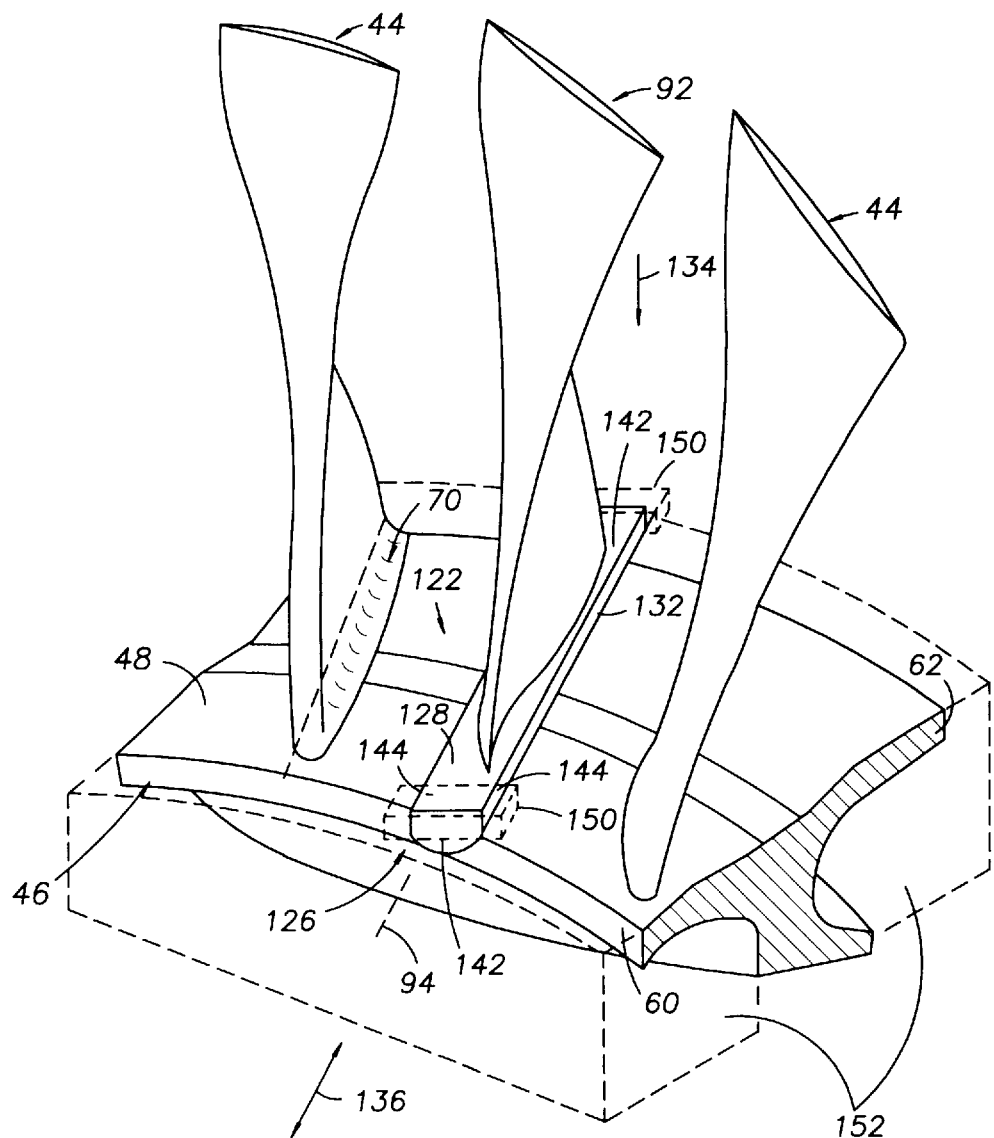
FIG. 4 is a fragmentary perspective view of the rotor assembly and the replacement blade of FIG. 3, with the replacement blade positioned to be linear friction welded to the rotor assembly.

Referring now to FIG. 4, the root portion 126 of the base 122 is positioned in the slot 90 (FIG. 3) to prepare for linear friction welding. The root surface makes contact with the recessed surface, thereby establishing an initial interface 132 for linear friction welding. In the best mode embodiment, the initial interface 132 comprises a substantial majority of the surfaces, though such initial contact is not required.

Linear friction welding begins by applying compressive 134 and oscillatory forces 136 to the base 122. The compressive forces 134 are directed roughly perpendicular to the surface of the disk rim 48. The oscillatory forces 136 are directed along an axis roughly parallel to the longitudinal axis 94 of the slot. These forces effectively place the interface 132 between the root and recessed surfaces under high pressure and cause the base to oscillate back and forth relative to the rim. At the interface, frictional heat is generated and material from each part changes to a plastic state. Some of this material flows out, in the form of flash, from between the parts, resulting in gradual decrease in the thickness of the parts. Eventually, the interface comprises substantially all points on the recessed surface, i.e., the root surface and the recessed surface are substantially contiguous over the area of the recessed surface, and thereby prevents flash from collecting at the base of the slot. When the process is terminated, the remaining plastic state material of each part cools and changes back to solid state, forming bonds therein and bonding the two parts together. Because, during welding, the root surface and the recessed surface are substantially contiguous over the area of the recessed surface, the weld between the base and the rim, is substantially continuous.

The base 122 may include longitudinally opposite sides 142 and laterally opposite sides 144 that serve as locations for holding the replacement blade 92 during linear friction welding. It is desirable to hold the replacement blade by the sides, 142, 144, rather than by the airfoil 120, to avoid distorting or damaging the airfoil 120. The longitudinally opposite sides 142 are oriented so as to be perpendicular to the oscillatory forces 136 (FIG. 4), the outer surface is oriented so as to be perpendicular to the compressive force, and the laterally opposite sides are oriented so as to be parallel to the compressive force 134 (FIG. 4).

In the best mode embodiment, the instrumentality for linear friction welding the base to the disk comprises a shuttle (schematically represented, in phantom) 150, a stationary fixture 152 (schematically represented, in phantom), and a computer controlled linear friction welding apparatus (not shown). The shuttle 150 holds the base 122. The stationary fixture 152 secures the rim 46. The shuttle and stationary fixture are each attached to the linear friction welding apparatus (not shown). The shuttle preferably holds the base, by way of the outer surface 128, the longitudinally opposite sides 142, and the laterally opposite sides 144. The shuttle receives compressive and oscillatory forces 134, 136 from the linear friction welding apparatus. The shuttle 150 transmits the compressive forces to the base by way of the outer surface 128, and transmits the oscillatory forces to the base by way of the longitudinally opposite sides 142. The stationary fixture 152 is preferably a clam shell type which clamps and supports the rim on the radially inner surfaces and the upstream and the downstream edges in order to keep the rim from moving and to support the rim so that it is not damaged during the linear friction welding process.

Figure 5:
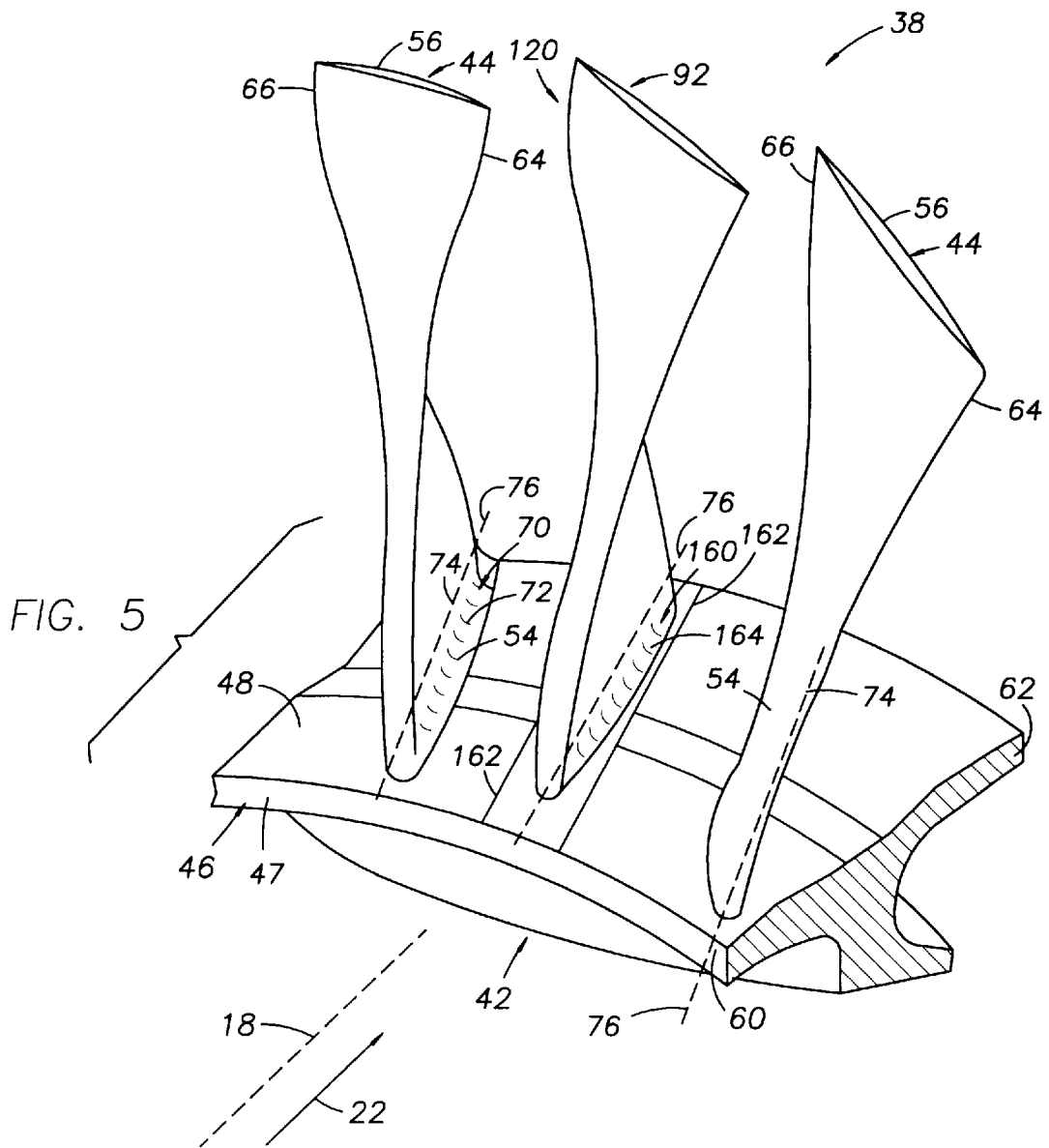
FIG. 5 is a fragmentary perspective view of the rotor assembly and the replacement blade of FIG. 4, with the replacement blade joined to the rotor assembly and finish machined after linear friction welding.

Once bonded to the rim, the replacement blade is released from the shuttle and shaped to its final form, i.e., similar to the blades 44. Referring now to FIG. 5, finishing typically comprises machining a fillet 160 between the outer surface and the airfoil surface, and machining the outer surface so that it is substantially flush at its lateral edges 162, with the radially outer surface 48 of the disk 46. The radius of the fillet is preferably uniform in order to keep the cost of the machining process as small as possible. The fillet may experience, during engine operation, high concentrations of stress at its base 164, where the surface of the fillet is tangent to the disk rim.

Figure 6:
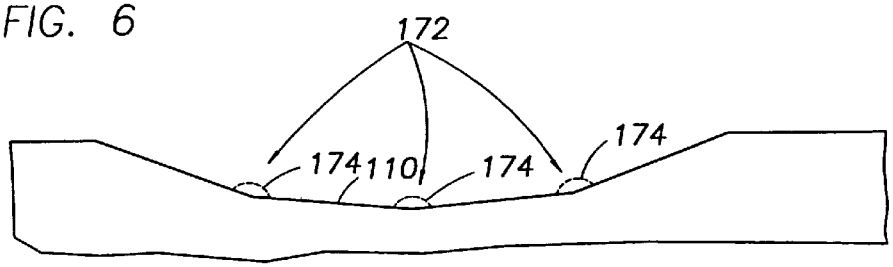
FIG. 6 is a fragmentary side view of a disk rim, showing a profile of a slot defined by a substantially smooth surface.

Referring again to FIG. 3, the slot 90 preferably has a cylindrical-like shape with an end view profile 170 having a substantially smooth curved shape including but not limited to circular (arced), elliptical, and parabolic. These shapes result in a single continuous surface that facilitates interfacing. The arced shape has the advantage that it is relatively straightforward to form, for example by milling, e.g., 3 axis milling using a cutter having a round bottom. However, the slot may have any suitable shaped end profile, including for example, a shape 110 (FIG. 6) that is at least substantially piecewise smooth. Referring now to FIG. 6, a substantially piecewise smooth profile is defined herein as a substantially curvilinear or substantially piecewise linear profile that may have corners 172 with angles 174, although the fewer and the less pronounced any corners the better. As described below, during linear friction welding, the pressure at the interface 132 (FIG. 4) is dependent on an angle of inclination 178 (FIG. 7) of the surface. Since a corner occurs in the context of two different angles of inclination, the pressure on one side of the corner can be grossly different that the pressure on the other side of the corner. This gross difference represents a discontinuity in the magnitude of the pressure at the corner and can affect the welding process. If the magnitude of the discontinuity, i.e., pressure difference, is excessive, a defect may result. Thus, it is recommended that the angles 174 have a magnitude of at least 160 degrees. Corners 172 with angles of 170 or 175 degrees are progressively more desirable than corners with angles of 160 degrees.

Referring again to FIG. 3, the slot 90 preferably extends from the upstream edge 60 of the rim to the downstream edge 62 of the rim. The slot should be spaced far enough from the adjacent blades 44 to ensure that there is enough clearance between the blades 44 for the shuttle 150 (FIG. 4) and the flash. The width 176 of the slot is preferably great enough to ensure that the distance between the weld and the high stress region at the base 164 of the fillet 160 is at least as great as the magnitude of the radius of the fillet. This distance separation helps to make sure that the weld is not exposed to excessive stress concentrations. The slot is preferably shallow.

Figure 7:
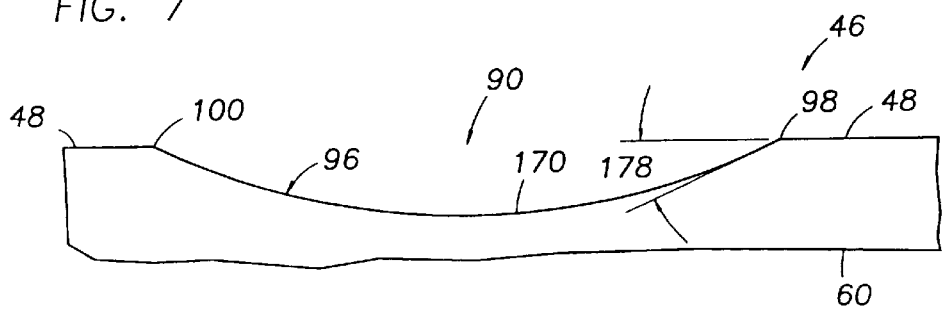
FIG. 7 is a fragmentary side view of the disk rim of FIG. 3 showing a profile of the slot in the best mode embodiment.

Referring now to FIG. 7, the recessed surface 96 has an angle of inclination 178 relative to the radially outer surface 48 of the disk rim. The magnitude of the compressive force needed for linear friction welding depends on this angle, i.e., the greater the angle of inclination, the greater the compressive forces needed to achieve sufficient pressure for linear friction welding. The angle of inclination 178 is preferably no greater than about 45 degrees, more preferably no greater than about 20 degrees, although suitable angles of inclination depend on the application.

Referring again to FIG. 3, the base 122 preferably has an elongated shape with a longitudinal axis 180, a length 182, and a width 184. The longitudinal axis 180 of the base 122 is preferably oriented substantially parallel to a chord 186 of the base of the airfoil 120 on the replacement blade 92. This orientation enables the widths of the base and the slot to be as small as possible, resulting in less surface area for the linear friction interface, and thereby enabling the use of compressive forces having as small a magnitude as possible. Further, this orientation enables the base to be oscillated, relative to the rim, while maintaining greater clearance between the airfoil of the replacement blade and the airfoils of the adjacent blades than that which could be maintained if the longitudinal axis was oriented axially, i.e., parallel to the longitudinal axis 18 of the engine and disk. This clearance is especially important in embodiments relating to compressor sections, in which there may be insufficient clearance to linear friction weld the blades if the slot is oriented axially.

The length 182 of the base is preferably greater than that of the slot 90 so that the base and the disk rim may be oscillated relative to each other without alternatingly exposing the upstream and downstream ends of the recessed surface 96. Avoiding alternating exposure helps to achieve a high quality bond at the upstream and downstream ends of the interface. The width 184 of the base is preferably adapted to closely match that of the slot 90, although in some embodiments, somewhat larger and smaller widths are permissible. The root portion 126 preferably has a shape, including an end profile, substantially matching that of the slot 90. The recessed and root surfaces 96, 130 preferably have ruled longitudinal contours to facilitate substantially uniform contact at the weld interface and better enable the flash to flow out from between the parts.

The replacement blade 92 is preferably manufactured in one piece. A preferred method uses forging, e.g., such as that conventionally used in the formation of blades, to first form a blade having an airfoil and a block. The block is then machined to form a base. In an alternative embodiment, the airfoil and the base may be manufactured separately and then joined together. In such an alternative, the airfoil may be welded to the base, and the base then welded to the disk rim, or, the base may be welded to the disk rim, and the airfoil then welded to the base.

There are various considerations pertaining to the rim. The rim should be sturdy enough to withstand the linear friction welding process, and should have enough mass to ensure that its temperature does not reach a magnitude so high as to result in a weld, i.e. a secondary weld, between the rim and the stationary fixture. To satisfy these considerations the thickness of the rim, beneath the slot at the upstream and downstream edge, is preferably at least 0.075 inches, more preferably at least 0.125 inches. In the best mode embodiment, this thickness is achieved making the rim substantially untapered at the upstream and downstream edges, unlike traditional disk rims which are tapered at the edges in order to reduce weight.

The materials used for the rim and the replacement blade should be chosen for the application to satisfy applicable design criteria, including for example, size, temperature, stress, other loading, speed, repairability, etc. Titanium alloys and nickel alloys are preferred. The magnitude of the compressive force required for linear friction welding should also be chosen for the application in consideration of the materials used for the rim and the replacement blade, the geometries of the rim and the replacement blade, and the cross sectional area of the interface.

Figure 8:
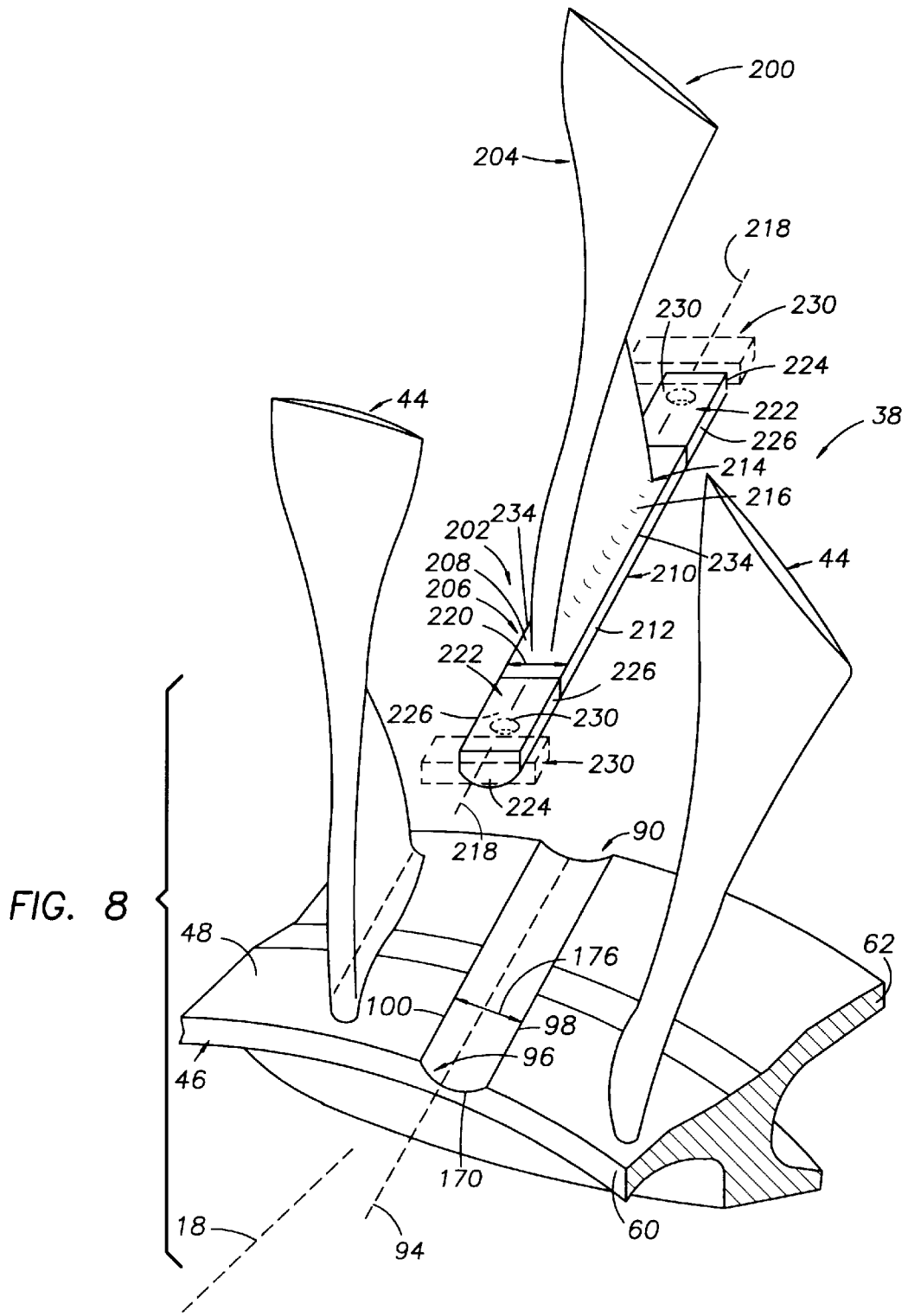
FIG. 8 is a fragmentary perspective view of the rotor assembly of FIG. 3, with a second embodiment of the replacement blade.

Referring now to FIG. 8, in a second embodiment of the process for repairing the integrally bladed rotor stage, a replacement blade 200 includes a base 202 and an airfoil 204. The base has a support portion 206 that supports the airfoil 204 and has an outer surface 208, and a root portion 210 with a root surface 212 facing in a direction generally opposite from that of the outer surface 208. The root portion 210 and the root surface 212 are substantially the same as the root portion and root surface 126, 130 (FIG. 3) described above.

The outer surface 208 of the support portion 206 is preferably finish machined at least in the vicinity of the base of the airfoil 204 prior to linear friction welding. Finish machining preferably includes machining to form a fillet 214 between the outer surface 208 and the airfoil 204 surface. The fillet 214 is substantially the same as the fillet 160 of the replacement blade 92 (FIG. 3). The fillet may experience, during engine operation, high concentrations of stress at its base 216, where the surface of the fillet is tangent to the outer surface 208 of the support portion 206.

The base 202 preferably has an elongated shape with a longitudinal axis 218, and a width 220. The longitudinal axis 218 of the base is preferably oriented substantially parallel to a chord of the base of the airfoil 204 on the replacement blade 200. The width 220 of the base is preferably adapted to closely match that of the slot 90, although in some embodiments, somewhat larger and smaller widths are permissible.

Two ears 222 are attached to the base 202 and used to hold the base 202 during linear friction welding. Thus the base 202 need not have longitudinally and laterally opposite sides similar to the opposite sides 142, 144 on the base 122 (FIG. 3). During linear friction welding, oscillatory forces are applied to the base 202 through the ears 222. The ears 222 may additionally be used to transmit compressive forces, however, compressive forces are preferably applied to the base through the outer surface 208. In one embodiment, the ears 222 have longitudinally opposite sides 224 and laterally opposite sides 226 that serve as locations for a shuttle 230 (shown in phantom) to hold the ears. During linear friction welding the shuttle 230 receives forces from the linear friction welding apparatus (not shown) and transmits the forces to base 202 through the ears 222. In an alternate embodiment, the ears 222 have holes 232 (shown in phantom) that serve as locations for holding and/or applying forces to the ears 222.

The rest of the repair process is similar to the method described above for linear friction welding the base 122 to the rim 46 (FIGS. 4,5), except that in this embodiment, linear friction welding continues until the lateral edges 234 of the outer surface 208 of the support portion 206 are substantially flush or nearly substantially flush with the radially outer surface 48 of the disk 46. Thus, with the possible exception of removal of flash, little or no machining is required to render the lateral edges 234 of the outer surface 208 substantially flush with the radially outer surface of the disk. The ears 222 are removed from the base using any convenient manner, e.g., by cutting off or machining.

The replacement blade 200 is preferably manufactured in substantially the same way as the replacement blade 92 (FIG. 3). The support portion 206 may then be machined so as to have the form described above. The ears 222 are preferably attached by any convenient manner, e.g., by electron beam welding, after manufacture of the blade 200. Alternatively, the blade 200 may be formed with the ears 222 already attached to the base 202.

The method and apparatus of the present invention may also be used for original equipment manufacture of an integrally bladed rotor stage such as that in FIG. 5. The process for original equipment manufacture comprises providing a disk similar to disk 42, forming a plurality of slots similar to slot 90 (FIG. 3) in the disk, and linear friction welding a plurality of blades similar to blade 92 (FIG. 3) or blade 200 (FIG. 8) into the slots. The disk may be fabricated using conventional forging processes, commonly used to fabricate disks for conventional bladed rotor assemblies. The disk is preferably formed to its final shape, e.g., by machining the disk in a lathe, in advance of forming the slots and attaching the blades. This "pre-forming" of the disk reduces the need for complex and expensive machining processes such as 5 axis milling. The slots are then formed, in the disk, and the blades are welded into the slots, typically one blade at a time, in a manner as described above for the repair procedure. All of the blades are preferably welded to the disk before performing any finish machining. After the welding is concluded, the flash is removed and finish machining is performed on all the blades, typically one blade at a time, in a manner as described above for the repair procedure, to complete the fabrication of the integrally bladed rotor stage.

The present invention provides an improved method for use in fabricating and repairing an integrally bladed rotor stage. Unlike the prior art stub process, the process of the present invention can be used for repair as well as for original equipment manufacture. Further, because the present invention achieves during linear friction welding, substantial contiguity between the root surface and the recessed surface over the area of the recessed surface, the present invention prevents flash from collecting at the base of the slot. Thus, the resulting weld between the base and the rim is substantially continuous and has less impurities, i.e., higher quality and fewer defects, than the prior art method that uses a root of generally wedge-like form with opposed converging surfaces and an axial slot having opposed diverging surfaces. Furthermore, in an embodiment of the present invention having a slot with a profile of at least substantially piecewise smooth shape and/or a recessed surface with an angle of inclination no greater than about 45 degrees, a bond of even higher quality will result. Moreover, in the best mode embodiment, the outer surface of the support portion ends up substantially flush with the radially outer surface of the disk, thereby making possible an integrally bladed rotor that weighs significantly less than previous integrally bladed rotor assemblies that use conventional blades having extended roots and platforms. Further, sealing between adjacent blades is generally not required and the edge of the linear friction weld is generally in the flow path.

Although the present invention is disclosed with respect to a best mode embodiment that uses linear friction welding, other embodiments may use other types of friction welding or other types of bonding methods. In such other embodiments, the shape of the base and the shape of the slot are adapted to the particular type of welding employed. Thus, the base and the slot need not have a linear shape and any longitudinal axes need be only approximations.

While the particular invention has been described with reference to embodiments for use in manufacturing and repairing an integrally bladed fan rotor, this description is not meant to be construed in a limiting sense. The present invention may be used in manufacture or repair of any integrally bladed rotor, particularly integrated rotors for a compressor section in a gas turbine engine. It is understood that various modifications of the above embodiments, as well as additional embodiments of the invention, will be apparent to persons skilled in the art upon reference to this description, without departing from the spirit of the invention, as recited in the claims appended hereto. It is therefore contemplated that the appended claims will cover any such modifications or embodiments as fall within the true scope of the invention.

What is claimed is:

1. An integral assembly comprising a base for an airfoil and a disk for an integrally bladed rotor stage in a gas turbine engine, fabricated by the process comprising:

providing the disk for an integrally bladed rotor stage, said disk having a radially outer rim with a radially outer surface, said radially outer rim having a slot with a longitudinal axis, said radially outer surface having a portion adjacent said slot, said slot being defined by a recessed surface;

providing the airfoil base, the airfoil base having a longitudinally extending root portion facing opposite a longitudinally extending support portion for supporting the airfoil, said root portion having a root surface, said support portion having an outer surface, said outer surface having lateral edges;

bringing said root surface of said root portion of said base into contact with said recessed surface bounding said slot; and applying pressure and relative movement between said base and said rim to achieve substantial contiguity between said root surface and said recessed surface over the area of said recessed surface, resulting in a substantially continuous linear friction weld between said base and said rim.

2. The assembly of claim 1 wherein the process further comprises forming any of said lateral edges of said outer surface which are not substantially flush with said adjacent portion of said radially outer surface of said rim, so as to render said lateral edges of said outer surface substantially flush with said adjacent portion of said radially outer surface of said rim.

3. The assembly of claim 2 wherein the said rim has two edges and said slot extends longitudinally from one of said edges to the other of said edges, said recessed surface has an angle of inclination relative to said radially outer surface of said rim and said angle of inclination is no greater than about 45 degrees, and said slot has a profile with a substantially smooth curved shape.

4. The assembly of claim 1 wherein said process step of applying pressure and relative movement further results in said lateral edges of said outer surface being substantially flush with said adjacent portion of said radially outer surface of said rim.

5. The assembly of claim 4 wherein the said rim has two edges and said slot extends longitudinally from one of said edges to the other of said edges, said recessed surface has an angle of inclination relative to said radially outer surface of said rim and said angle of inclination is no greater than about 45 degrees, and said slot has a profile with a substantially smooth curved shape.

6. The assembly of claim 1 wherein the airfoil is integral to said base.

7. The assembly of claim 6 wherein the said rim has two edges and said slot extends longitudinally from one of said edges to the other of said edges, said recessed surface has an angle of inclination relative to said radially outer surface of said rim and said angle of inclination is no greater than about 45 degrees, and said slot has a profile with a substantially smooth curved shape.

8. The assembly of claim 1 wherein said slot has a profile with at least a substantially piecewise smooth shape.

9. The assembly of claim 8 wherein said profile has no corners with angles of less than 175 degrees.

10. The assembly of claim 1 further comprising machining said slot in said radially outer rim.

11. The assembly of claim 1 wherein said rim has two edges and said slot extends longitudinally from one of said edges to the other of said edges.

12. The assembly of claim 1 wherein said recessed surface has an angle of inclination relative to said radially outer surface of said rim and said angle of inclination is no greater than about 45 degrees.

13. The assembly of claim 1 wherein said recessed surface has an angle of inclination relative to said radially outer surface of said rim and said angle of inclination is no greater than about 20 degrees.

14. The assembly of claim 1 wherein said slot has a profile with a substantially smooth curved shape.

15. The assembly of claim 1 wherein said slot has a cylindrical-like shape.

16. The assembly of claim 1 wherein said longitudinal axis of said base is substantially parallel to a chord of the airfoil.

17. The assembly of claim 1 wherein said longitudinal axis of said base is substantially parallel to a chord of the base of the airfoil.

18. An integral assembly for a gas turbine comprising:

a disk for an integrally bladed rotor stage, said disk having a radially outer rim with a radially outer surface, said radially outer rim having a slot with a longitudinal axis, said radially outer surface having a portion adjacent said slot, said slot being defined by a recessed surface; and a plurality of airfoils with each of said plurality of airfoils having an airfoil base, said airfoil base having a longitudinally extending root portion facing opposite a longitudinally extending support portion for supporting the airfoil, said root portion having a root surface, said support portion having an outer surface, said outer surface having lateral edges, wherein said root surface of said root portion of said base is linear friction welded with said recessed surface bounding said slot to achieve substantial contiguity between said root surface and said recessed surface over the area of said recessed surface, resulting in a substantially continuous linear friction weld between said base and said rim.

19. The assembly according to claim 18 wherein said lateral edges of said outer surface are substantially flush with said adjacent portion of said radially outer surface of said rim.

20. The assembly according to claim 18 wherein said airfoil is integral to said base.

21. The assembly according to claim 18 wherein said slot has a profile with at least a substantially piecewise smooth shape.

22. The assembly according to claim 18 wherein said profile has no corners with angles of less than 175 degrees.

23. The assembly according to claim 18 wherein said recessed surface has an angle of inclination relative to said radially outer surface of said rim and said angle of inclination is no greater than about 45 degrees.

24. The assembly according to claim 18 wherein said recessed surface has an angle of inclination relative to said radially outer surface of said rim and said angle of inclination is no greater than about 20 degrees.

25. The assembly according to claim 18 wherein said slot has a profile with a substantially smooth curved shape.

26. The assembly according to claim 18 wherein said slot has a cylindrical-like shape.

* * * * *